(12) United States Patent
Van Bijsterveld

(10) Patent No.: US 7,035,512 B2
(45) Date of Patent: Apr. 25, 2006

(54) METHOD FOR PROVIDING A BROADBAND INFRASTRUCTURE IN A BUILDING BY MEANS OF OPTICAL FIBERS

(75) Inventor: Cornelis Casparus Van Bijsterveld, Voorschoten (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 10/471,506

(22) PCT Filed: Mar. 15, 2002

(86) PCT No.: PCT/EP02/03161

§ 371 (c)(1),
(2), (4) Date: Jan. 21, 2004

(87) PCT Pub. No.: WO02/075422

PCT Pub. Date: Sep. 26, 2002

(65) Prior Publication Data

US 2004/0126068 A1   Jul. 1, 2004

(30) Foreign Application Priority Data

Mar. 16, 2001   (NL) .................................. 1017619

(51) Int. Cl.
*G02B 6/44* (2006.01)

(52) U.S. Cl. ........................................ 385/101; 385/15

(58) Field of Classification Search ................ 385/101, 385/14, 15, 31, 33, 34, 100, 102; 439/147, 439/577
See application file for complete search history.

(56) References Cited

U.S. PATENT DOCUMENTS

| 4,678,264 A | 7/1987 | Bowen et al. ............. 350/96.2 |
| 4,850,901 A * | 7/1989 | Smith et al. ................. 439/676 |
| 4,897,711 A * | 1/1990 | Blonder et al. ............... 257/48 |
| 4,986,625 A | 1/1991 | Yamada et al. ............ 350/96.2 |
| 5,267,122 A | 11/1993 | Glover et al. ................ 361/704 |
| 5,299,947 A | 4/1994 | Barnard ..................... 439/215 |
| 6,754,407 B1* | 6/2004 | Chakravorty et al. ......... 385/14 |
| 6,799,902 B1* | 10/2004 | Anderson et al. ............. 385/89 |
| 2003/0161603 A1* | 8/2003 | Nadeau et al. .............. 385/137 |

FOREIGN PATENT DOCUMENTS

| DE | 94 04 230 | 8/1995 |
| DE | 196 487 780 | 5/1998 |
| EP | 0 337 682 | 10/1989 |
| EP | 0 939 915 | 5/1998 |
| GB | 2 322 479 | 8/1998 |
| JP | 06-034828 | 2/1994 |
| JP | 07-037441 | 2/1995 |

* cited by examiner

*Primary Examiner*—Khiem Nguyen
(74) *Attorney, Agent, or Firm*—Michaelson & Associates; Peter L. Michaelson; Alberta A. Vitale

(57) ABSTRACT

A system and method for the transmission of optical signals via optical fibers in a building provided with a system of conduits for electric wires. The optical fibers are ducted through the same conduits as the electric wires. The optical fibers are fitted to the same wall or ceiling terminals as the electric wires. The terminals can comprise connectors to which the optical fibers are fitted, or optical transceivers. The terminals can also comprise electrically supplied modules for amplifying, processing, routing or converting the optical signals. Monitoring, controlling, processing etc. of the optical signals can be done in a central element, in the proximity of a central module for monitoring etc. the electric energy in the building.

13 Claims, 4 Drawing Sheets

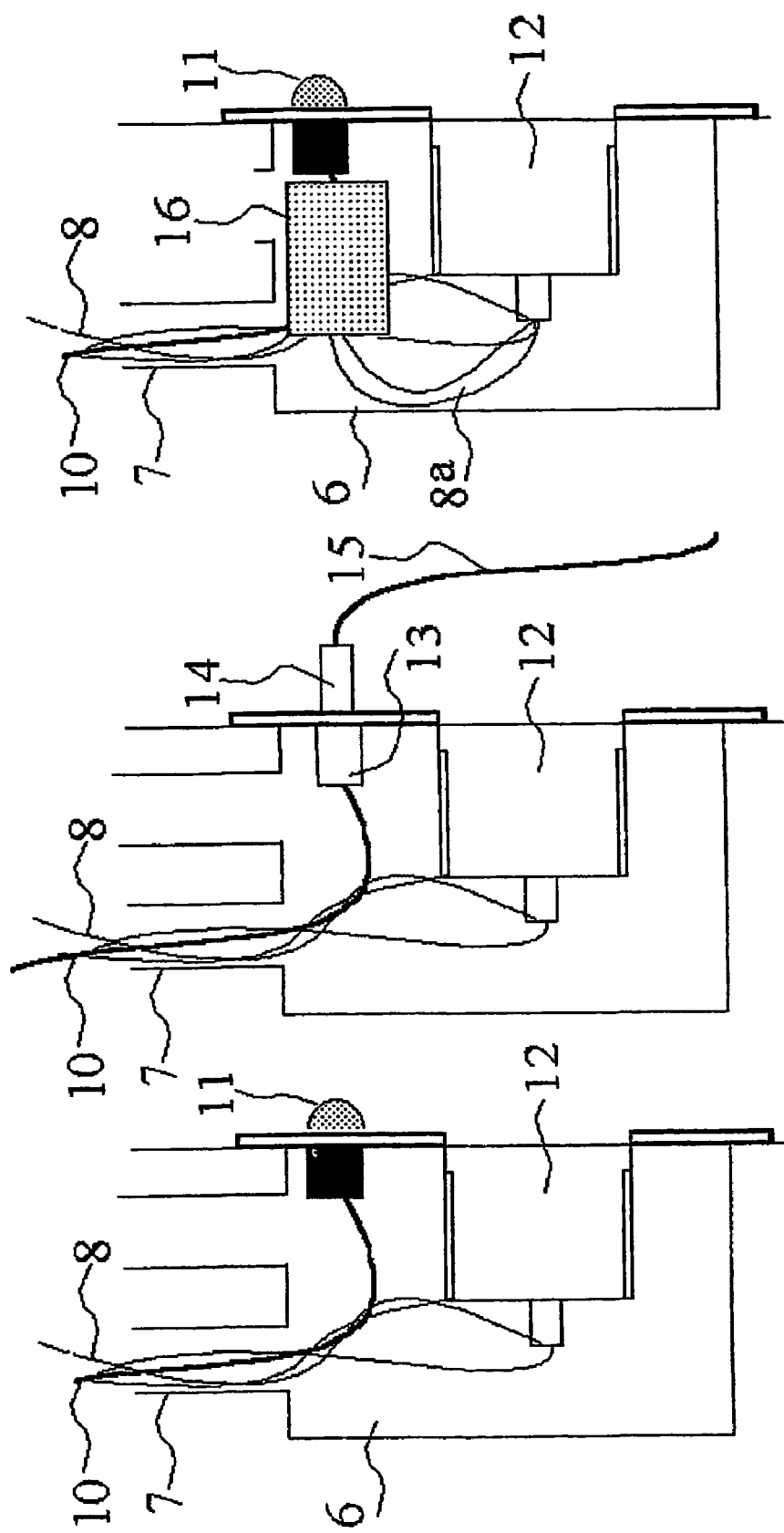

METHOD FOR PROVIDING A BROADBAND INFRASTRUCTURE IN A BUILDING BY MEANS OF OPTICAL FIBERS

BACKGROUND

The invention relates to a method for providing a broadband infrastructure in a building by means of optical fibres for the transmission of optical signals, which building is provided with a system of conduits for ducting electric wires for the transfer of electric energy.

The invention further relates to a system for the transmission of optical signals via optical fibers in a building, which building is provided with a system of conduits for enveloping electric wires for the transfer of electric energy.

"Fibre To The Office" (FTTO) and "Fibre To The Home" (FTTH), increase of the number of PCs etc. and increase of broadband applications (Internet, multimedia, etc.) for application in offices and private situations induce a need for the application of optical fibres within buildings, houses, etc. In house-construction, normally no special facilities—cable ducts, etc.—are provided for the installation and maintenance of a computer network. The object of the present invention is to provide a method and system for installing and maintaining a network of optical fibres throughout the building without special constructional interventions. The invention is applicable in both new and existing buildings.

SUMMARY OF THE INVENTION

According to the invention, it is presently proposed to duct the optical fibres through the same conduits as the wires of the electric installation. In new houses to be built, the electric wires and optical fibres will preferably be pushed, pulled or blown simultaneously into the conduits. In existing houses —where the electric wires have already been installed—the optical fibres, if possible, will be added to the wiring already present. Where this is not possible, the electric wiring will possibly have to be removed first to be subsequently re-introduced together with the optical fibre(s) to be added. In the design of an in-house network based on this method (use of fibre), it is also possible to project paths that do not run through electric conduits (for instance plastic fibre along a skirting-board).

Preferably, the fibres are fitted to the same terminals as those to which the electric wires are fitted, so that those terminals, the wall sockets and light connections, at the same time serve as interface to and from the PCs etc. In the system according to the invention, therefore, the fibres—after installation—are enveloped by the same conduits as the electric wires.

Accordingly, the system of the invention preferably comprises wall or ceiling terminals to which both the electric wires and the optical fibres are fitted. The terminals can comprise one or more connectors to which an optical fibre is fitted and to which a matching counter-connector can be connected. In this way, a PC—or other information processor—can be connected with the optical home network and, via that optical network, with PCs etc. in the rest of the house or the building or, via an interface, with a public network. Another option is for the terminals to comprise an optical transceiver to which an optical fiber is fitted. An optical transceiver is herein understood to mean an element by which the light signals (e.g. infrared) supplied by the optical fiber are optically radiated to its surroundings and by which, in the opposite direction, light signals can be received and presented to the optical fiber. Communication with the PCs etc. in the space where the terminals are, proceeds in a noncontact manner via optical (IR) transmitters and receivers in the PCs etc. The transmitter and receiver, respectively, of the wall/ceiling terminal can comprise—as known per se—an optical lens and/or an optical reflector. Since the optical fibers are fitted to the same terminals as those to which the electric wires have been fitted, this combination affords a synergetic possibility of providing the terminals with electrically supplied amplification means for amplifying the optical signals.

If it is necessary to convert the optical signals in any way, that possibility is also afforded by the terminals. Thus, the terminals can comprise electrically supplied conversion means for converting the optical signals transmitted and received, respectively, via those terminals. Thus, it is possible for the conversion means to convert the optical signals to electrical signals and vice versa, with the electrical signals being presented to, or taken from, electrical connectors which are comprised by the terminals and to which a matching counter-connector can be connected. This O/E converter incorporated into the terminal affords the possibility of connecting PCs in the electric domain with the—optical—home network and with each other.

Also, the terminal can comprise processing or routing means for processing and/or routing the signals transferred via the optical fibres. Such processing or routing means too can be simply supplied, in the terminal, from the electricity grid. Normally, the electric wires per building, or per section of the building, meet in a central unit—switchboard—for monitoring and/or controlling the electric energy transferred via the electric wires, in the building or section thereof. As a logical extension of the system according to the invention, the system also comprises a central element for monitoring, processing and/or controlling the information transferred via the optical fibres, in the building or section thereof. Such central element can be formed, for instance, by a central computer or home network server, which, at the central location also accommodating the electric switchboard and possibly the telecommunication connection (the "meter cupboard"), can then be formed integrally with the other facilities, electricity, telecommunication. Such an arrangement also affords practical possibilities of "telemetering" electricity, gas, etc.

The present method can be seen as a supplement to other methods for laying out an in-house infrastructure. The method is cheaper than installing a separate conduit system. Compared with the use of radio waves, this method does not involve any risk of interference and disturbance of other equipment (e.g. in hospitals) or possible health hazards of radio waves. The use of light signals (e.g. infrared) can be limited to specific spaces, which can be an advantage.

BRIEF DESCRIPTION OF THE DRAWINGS

The teachings of the present invention can be readily understood by considering the following detailed description in conjunction with the accompanying drawings, in which:

FIG. 3 depicts wall terminal 6 which also utilizes the teachings of the present invention;

FIG. 4 depicts a second embodiment of inventive wall terminal 6;

FIG. 5 depicts a third embodiment of inventive wall terminal 6;

To facilitate understanding, identical reference numerals have been used, where possible, to designate identical elements that are common to the figures.

DETAILED DESCRIPTION

Figure 1:
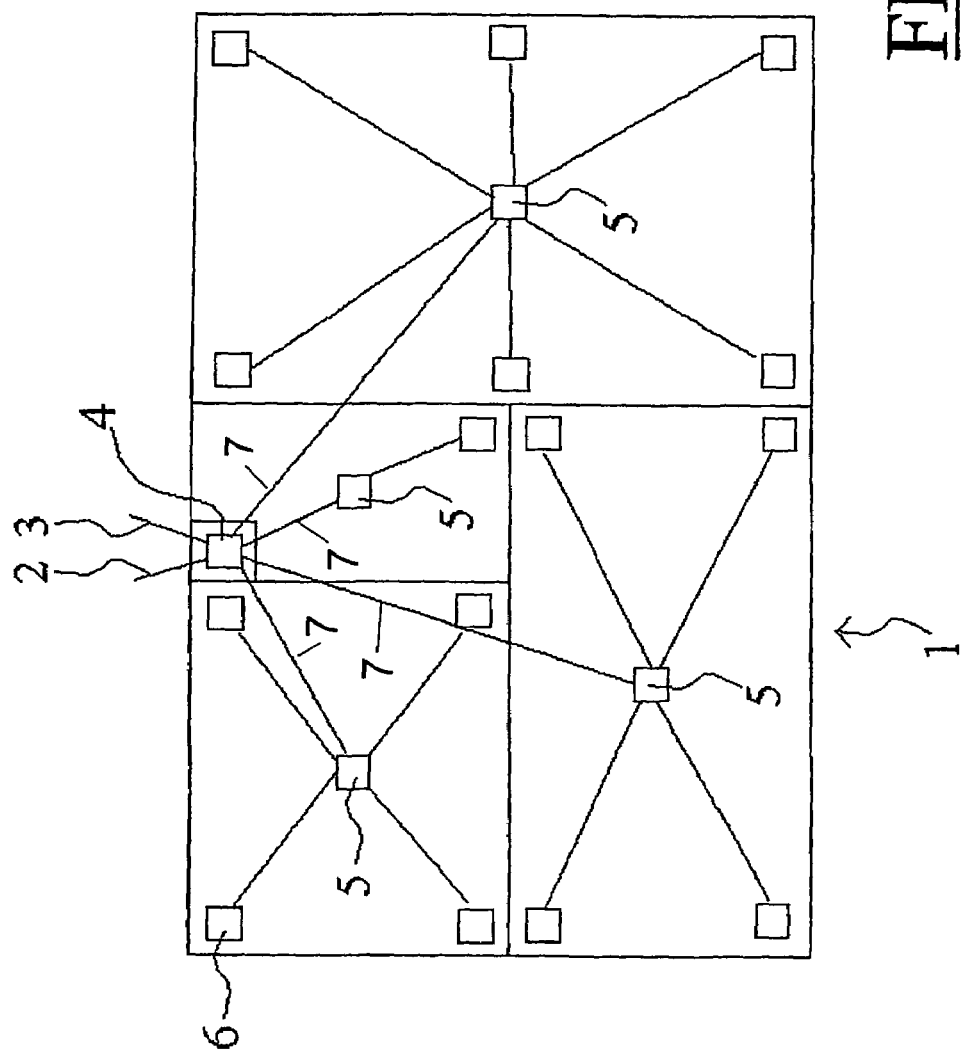
FIG. 1 schematically depicts a conduit system of a conventional electrical installation in a building in which the present invention can be incorporated.

FIG. 1 schematically shows a conduit system of a conventional electric installation in a building 1. The building 1 is connected via cables 2 and 3 to the public electricity grid and communication/media network, respectively. The latter network comprises an optical fibre ("Fibre To The Office" (FTTO) and "Fibre To The Home"(FTTH)) enabling broadband transmission. From a central distribution point 4, at least one conduit 7 passes to a central junction box 5 present in each space and mounted in the ceiling. The central junction box 5 constitutes a base terminal for connecting lighting fixtures etc. and for further distributing the electric energy in the room, via conduits passing to different wall sockets 6 and any further ceiling outlets, for further lighting fixtures. Through the conduits 7 pass electric wires 8 (see FIG. 2) which have been pulled, pushed or blown into the conduits.

According to the invention, the optical fibres 10 are ducted from the distribution point 4 through the same conduits 7 as the electric wires. Further, the optical fibres are fitted to the same ceiling outlets 5 and wall outlets 6 as those to which the electric wires are fitted. It is noted that the terminals are understood to be constituted by the wall and ceiling outlets 5 and 6, possibly along with any components connected therewith, such as (lighting) fixtures, wall sockets, switches, etc. Hereinbelow, reference will be made to the terminals 5 and 6, which, accordingly, may or may not—depending on specific designs that may be given to them by different manufacturers—comprise components mounted thereon or thereto.

Figure 2:
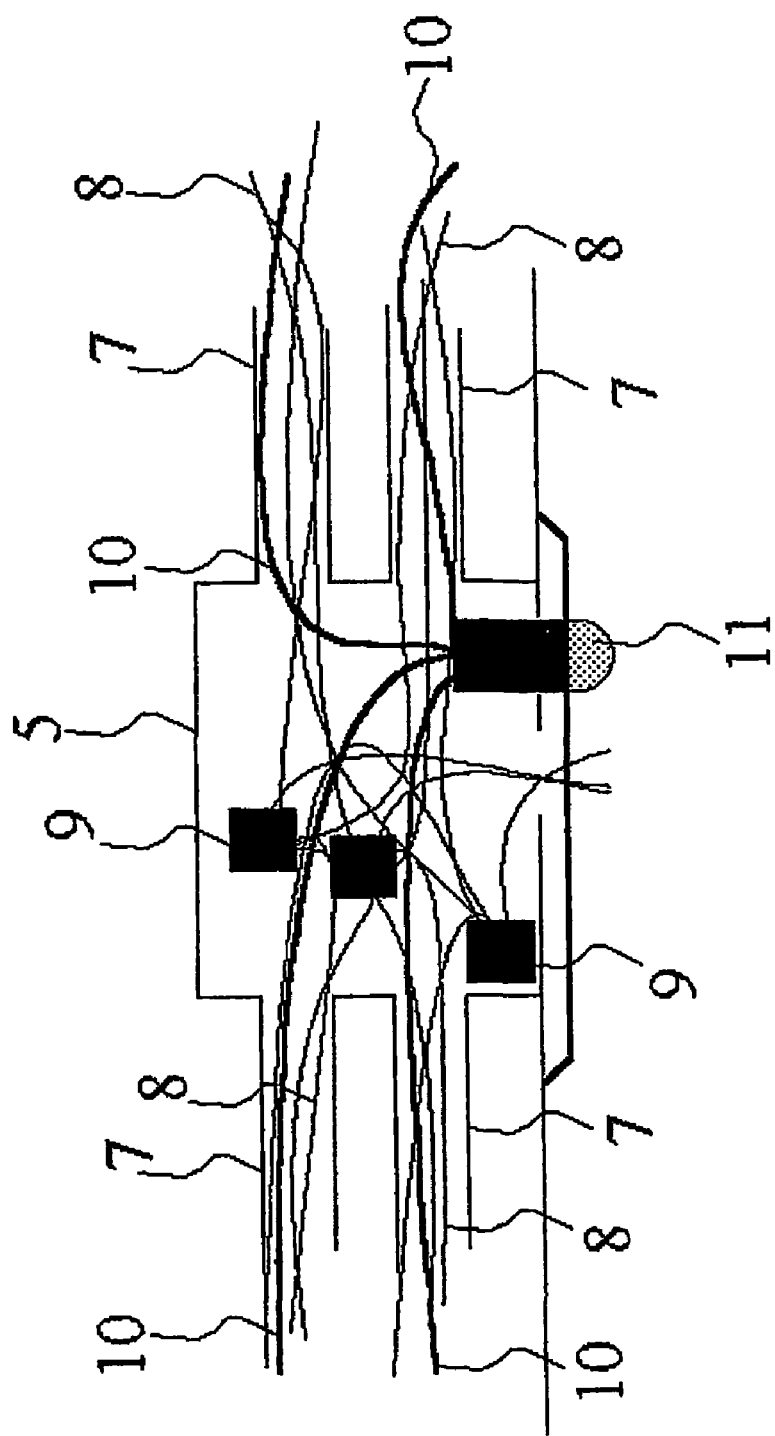
FIG. 2 depicts ceiling terminal 5 which utilizes the teachings of the present invention.

FIG. 2 shows a ceiling terminal 5. Via the conduits 7, the electric wires 8 are supplied, which, with the aid of wire connectors 9, are connected to each other and to, for instance, a lighting fixture. In addition to the wires 8, the conduits 7 also duct optical fibers 10, which have preferably been pulled into the conduits together with the electric wires. The optical fibres can be connected to each other and to an optical transceiver (transmitter/receiver) 11. The transceiver 11 normally comprises a lens, sometimes a reflector, with which, on the one hand, IR light signals supplied by the optical fibre are radiated to the respective space, and with which, on the other hand, IR light signals from, for instance, equipment disposed in that space are received. In other words, the terminal 5 comprises an IR port, known per se.

FIG. 3 shows a wall terminal 6, to which the electric wires 8 and optical fibre 10 supplied through the conduit 7 are connected, that is, the fibre 10 to an optical transceiver 11 and the wires 8 to an electrical wall plug 12. FIG. 4 shows the same wall terminal 6, though with the optical transceiver 11 replaced by an optical connector 13 to which the optical fiber 10 is fitted and to which a PC etc. can be connected via a matching counter-connector 14 and an optical cable 15.

FIG. 5 shows the same wall terminal 6, provided with a transceiver 11, but additionally provided with a built-in electrically supplied optical amplifier 16, for amplifying the optical signals exchanged via the transceiver 11. The amplifier 16 is supplied from the electricity grid via electric supply wires 8a.

Figure 6:
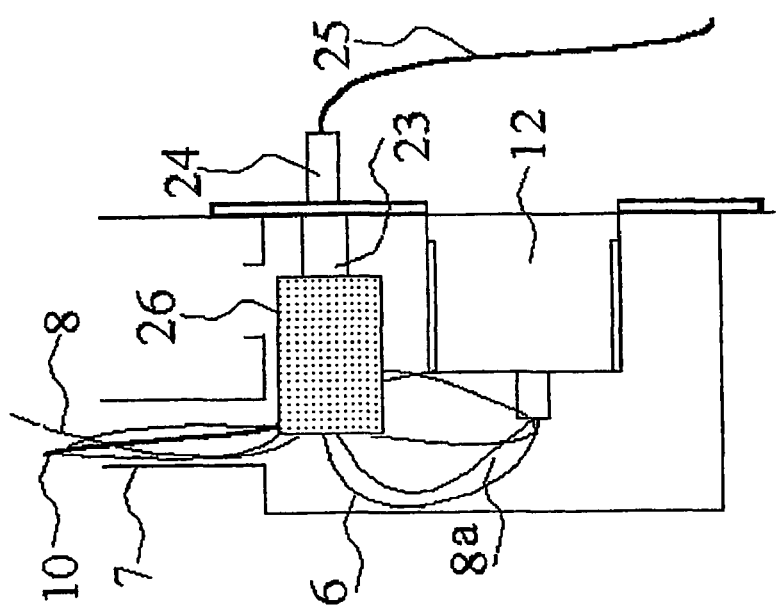
FIG. 6 depicts a fourth embodiment of inventive wall terminal 6.

FIG. 6 shows a wall terminal 6, provided with an electrical connector 23 to which a PC etc. can be connected via a matching counter-connector 24 and an electric cable 25. Conversion of the optical signals—transferred by the optical fibre 10—into electrical signals—transferred by the connectors 23 and 24 and the cable 25 to and from the PC etc.—takes place in an E/O converter 26 which is incorporated into the terminal 6 and which draws its electric supply via the electric wires 8, likewise fitted in that same terminal 6. By installing an E/O converter 26, PCs etc. which do not possess an optical interface can still communicate via the optical home network. It is noted that instead of the modules 16 and 26 shown, other—electrically supplied—modules can be installed in the terminals 5 or 6, for instance processing or routing modules ("domestic routers") for processing and/or routing the signals transferred via the optical fibres.

Figure 7:
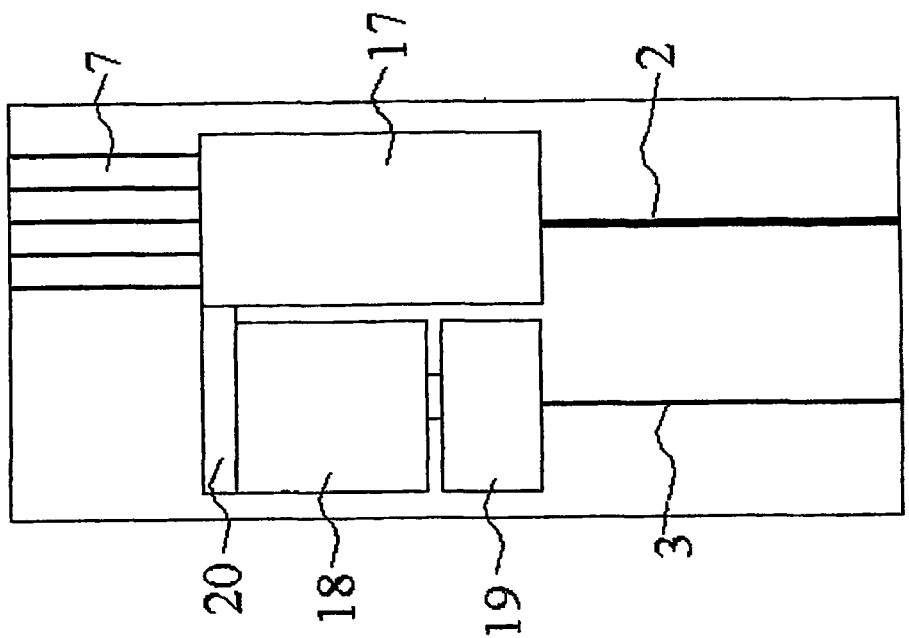
FIG. 7 depicts a further elaboration of central power point 4 shown in FIG. 1.

FIG. 7 shows a further elaboration of the central power point 4 shown in FIG. 1. The electric wires 8 located within conduits 7 meet in a central element 17—the central switchboard—where the electric energy distributed via the electric wires in the building, in particular power consumption and safety (earth leakage etc.), is monitored. In the same space—the "meter cupboard"—there is also a central element 18 which monitors, processes and/or controls the optical signals to and from the building 1 via the optical cable 3. The central element can comprise, for instance, a central home computer or home server via which telecommunication, multimedia exchange (internet, video, etc.) with the outside world proceed and which, on the other hand, provides for network management etc within the building. If desired, the telecommunication section can be concentrated in a telecommunication home exchange 19. The optical fibres 10 of the home network are connected via a connection module 20 to the housing of the electrical switchboard 17, such that the optical fibers 10, together with the electric wires 8, can be ducted via the conduits 7 to the different terminals 5 and 6 in the building, where they can be connected to the different PCs etc., via the IR transceivers 11 and the connectors 13, 23, 14, 24, respectively.

The invention claimed is:

1. A method for providing broadband infrastructure in a building by using optical fibers for transmission of optical signals, the building being provided with conduits for ducting electric wires, the electrical wires to be used to transfer electric energy, wherein the optical fibers are ducted through the same conduits as the electric wires; the method comprising the steps of:

fitting a plurality of the electric wires in one of said conduits to a wall or ceiling terminal and at least one of the optical fibers in said one conduit jointly to the same terminal, the terminal having an optical transceiver, to which said one optical fiber has been fitted, and an optical lens; and radiating infrared light signals, through the lens and supplied by said one optical fiber, into a space and receiving infrared light signals, through the lens, from equipment present in the space.

2. The method recited in claim 1 wherein the transceiver comprises an optical reflector.

3. The method recited in claim 1 wherein the terminal further comprises an amplifier for amplifying the infrared light signals exchanged by the transceiver, wherein power is supplied to the amplifier by the plurality of electric wires.

4. The method recited in claim 1 wherein the terminal further comprises a module which receives power supplied by the plurality of electric wires.

5. The method recited in claim 4 wherein the module operates on signals appearing on the one optical fiber.

6. Apparatus for transmitting optical signals via optical fibers in a building, the building having conduits for enveloping electric wires, the electrical wires to be used to transfer electric energy, wherein the optical fibers are enveloped by the same conduits as the electric wires, the apparatus comprising:
- a wall or ceiling terminal to which a plurality of the electric wires in one of said conduits and one of the optical fibers in said one conduit are jointly fitted, the terminal having an optical transceiver, to which said one optical fiber has been fitted; and
- the optical transceiver, comprising an optical lens, for radiating infrared light signals supplied by said one optical fiber into a space and for receiving infrared light signals from equipment present in the space.

7. The apparatus recited in claim 6 wherein the transceiver comprises an optical reflector.

8. The apparatus recited in claim 6 wherein the terminal further comprises an amplifier for amplifying the infrared light signals exchanged by the transceiver, wherein power is supplied to the amplifier by the plurality of electric wires.

9. The apparatus recited in claim 6 further comprising a module which receives power supplied by the plurality of electric wires.

10. The apparatus recited in claim 9 wherein the module operates on signals appearing on the one optical fiber.

11. Apparatus for transmitting optical signals via optical fibers in a building, the building being provided with conduits for enveloping electric wires, the electric wires to be used to transfer electric energy, the optical fibers being enveloped by the same conduits as the electric wires, the apparatus comprising:
- a wall or ceiling terminal to which a plurality of the electric wires in one of the conduits and one of the optical fibers in said one conduit are jointly fitted, the terminal having a connector and an electrical-to-optical (E/O) converter, wherein the one optical fiber is fitted, via the E/O converter, to the connector to which a matching counter-connector can be connected; and
- wherein the E/O converter is arranged to convert between electrical signals transferred by said connectors and optical signals transferred by said one optical fiber.

12. The apparatus recited in claim 11 further comprising a module which receives power supplied by the plurality of electric wires.

13. The apparatus recited in claim 12 wherein the module operates on the signals transferred via the one optical fiber.

* * * * *